United States Patent
Park et al.

(10) Patent No.: US 9,632,978 B2
(45) Date of Patent: Apr. 25, 2017

(54) RECONFIGURABLE PROCESSOR BASED ON MINI-CORES, SCHEDULE APPARATUS, AND METHOD THEREOF

(71) Applicant: Samsung Electronics Co., Ltd., Suwon-si (KR)

(72) Inventors: Hae-Woo Park, Seoul (KR); Won-Sub Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 654 days.

(21) Appl. No.: 13/827,280

(22) Filed: Mar. 14, 2013

(65) Prior Publication Data

US 2013/0246735 A1     Sep. 19, 2013

(30) Foreign Application Priority Data

Mar. 16, 2012  (KR) ................. 10-2012-0027400

(51) Int. Cl.
  *G06F 9/30*     (2006.01)
  *G06F 15/80*    (2006.01)
  *G06F 9/45*     (2006.01)
  *G06F 15/78*    (2006.01)
  *G06F 9/38*     (2006.01)

(52) U.S. Cl.
  CPC ............ *G06F 15/80* (2013.01); *G06F 8/4452* (2013.01); *G06F 9/3012* (2013.01); *G06F 9/3891* (2013.01); *G06F 15/7867* (2013.01); *G06F 15/8023* (2013.01)

(58) Field of Classification Search
  None
  See application file for complete search history.

(56) References Cited

U.S. PATENT DOCUMENTS

| | | | |
|---|---|---|---|
| 2006/0212678 A1 | 9/2006 | De Oliveira Kastrup Pereira | |
| 2007/0288930 A1* | 12/2007 | Yim | G06F 9/485 718/107 |
| 2009/0070552 A1 | 3/2009 | Kanstein et al. | |
| 2009/0288075 A1* | 11/2009 | Song | G06F 8/452 717/160 |

(Continued)

FOREIGN PATENT DOCUMENTS

| | | |
|---|---|---|
| CN | 1833222 A | 9/2006 |
| CN | 101625635 A | 2/2010 |

(Continued)

OTHER PUBLICATIONS

Z. Huang et al., "Exploiting Operation Level Parallelism through Dynamically Reconfigurable Datapaths," *Proceedings of the 39th Design Automation Conference (DAC 2002)*, pp. 337-342, conference held Jun. 10-14, 2002, New Orleans, LA, paper 24.1 presented on Jun. 12, 2002, see pp. 338-339 and 340-341.

(Continued)

*Primary Examiner* — Scott Sun
(74) *Attorney, Agent, or Firm* — NSIP Law (57) ABSTRACT

A reconfigurable processor based on mini-cores (MCs) includes a plurality of MCs, each MC of the MCs including a group of function units (FUs), the group of FUs having a capability of executing a loop iteration independently. The MCs include a first MC configured to execute a first loop iteration, and a second MC configured to execute a second loop iteration.

22 Claims, 10 Drawing Sheets

(56) References Cited

U.S. PATENT DOCUMENTS

| | | | |
|---|---|---|---|
| 2010/0164949 A1 | 7/2010 | Min et al. | |
| 2010/0185839 A1 | 7/2010 | Oh et al. | |
| 2010/0268862 A1* | 10/2010 | Park | G06F 15/7867 711/101 |
| 2011/0099555 A1* | 4/2011 | Kwon | G06F 15/7875 718/108 |
| 2012/0110302 A1* | 5/2012 | Bikshandi | G06F 9/3851 712/16 |
| 2013/0111453 A1* | 5/2013 | Kalogeropulos | G06F 8/4452 717/161 |

FOREIGN PATENT DOCUMENTS

| | | |
|---|---|---|
| CN | 102163247 A | 8/2011 |
| CN | 101625635 B | 11/2011 |
| CN | 102306141 A | 1/2012 |
| KR | 10-2009-0045744 A | 5/2009 |
| KR | 10-2010-0077528 A | 7/2010 |
| KR | 10-2010-0084898 A | 7/2010 |

OTHER PUBLICATIONS

J.-e. Lee et al., "Compilation Approach for Coarse-Grained Reconfigurable Architectures," *IEEE Design & Test of Computers*, vol. 20, No. 1, Jan.-Feb. 2003, pp. 26-33, see pp. 28-29.

Z.-ul-Abdin et al., "Evolution in architectures and programming methodologies of coarse-grained reconfigurable computing," *Microprocessors and Microsystems*, vol. 33, No. 3, May 2009, pp. 161-178, see p. 169.

O.S. Dragomir et al., "K-loops: Loop skewing for Reconfigurable Architectures," *Proceedings of the 2009 International Conference on Field-Programmable Technology (FPT 2009)*, pp. 199-206, conference held Dec. 9-11, 2009, Sydney, Australia, paper presented on Dec. 11, 2009, see FIG. 5.

Y. Kim et al., "Exploiting Both Pipelining and Data Parallelism with SIMD Reconfigurable Architecture," *Lecture Notes in Computer Science, Reconfigurable Computing: Architectures, Tools and Applications, Proceedings of the 8th International Symposium on Applied Reconfigurable Computing (ARC 2012)*, vol. 7199, 2012, p. 40-52, conference held Mar. 19-23, 2012, Hong Kong, China, see p. 41, paragraph 2, and p. 42, last paragraph—p. 43, paragraph 1.

Extended European Search Report issued on Jun. 24, 2013, in counterpart European Patent Application No. 13159758.5 (11 pages, in English).

Chinese Office Action issued Nov. 17, 2016, in counterpart Chinese Application No. 201310086205.1 (13 pages in English, 9 pages in Chinese).

* cited by examiner

RECONFIGURABLE PROCESSOR BASED ON MINI-CORES, SCHEDULE APPARATUS, AND METHOD THEREOF

CROSS-REFERENCE TO RELATED APPLICATIONS

This application claims the benefit under 35 USC 119(a) of Korean Patent Application No. 10-2012-0027400 filed on Mar. 16, 2012, the entire disclosure of which is incorporated herein by reference for all purposes.

BACKGROUND

1. Field

The following description relates to a reconfigurable architecture and a loop scheduling method.

2. Description of Related Art

In general, a reconfigurable architecture is an architecture that can change the hardware configuration of a computing apparatus so that hardware configuration is optimized for a specific task.

Processing a certain task only in hardware presents difficulties in efficiently handling modifications or changes made during processing of the task due to the fixed functionality of the hardware, while processing a certain task only in software can easily deal with modifications or changes made during processing of the task, but results in a low processing speed compared to hardware processing of the task.

The reconfigurable architecture has been designed to obtain all of the advantages of hardware processing and software processing. In particular, the reconfigurable architecture has attracted a lot of attention in a digital signal processing field in which the same tasks are iteratively executed.

A representative reconfigurable architecture is a Coarse-Grained Array (CGA). The CGA is constituted by a plurality of processing units and can be optimized for a specific task by changing connections between the processing units.

It is difficult to quickly obtain an appropriate solution for loop scheduling for a general CGA, so many heuristic algorithms for solving this problem have been developed. The conventional algorithms are based on modulo scheduling to increase utilization of function units of the CGA. In the conventional algorithms, a high utilization of function units can be obtained when the number of function units is small, but when a large number of function units are used, it is difficult to obtain a high utilization of the function units.

SUMMARY

In one general aspect, a reconfigurable processor based on mini-cores (MCs) includes a plurality of MCs, each MC of the MCs including a group of function units (FUs), the group of FUs having a capability of executing a loop iteration independently; wherein the MCs include a first MC configured to execute a first loop iteration; and a second MC configured to execute a second loop iteration.

The second MC may be further configured to start executing the second loop iteration after the first MC starts executing the first loop iteration when there is a dependency between the first loop iteration and the second loop iteration.

The FUs of each MC of the MCs may be homogeneous FUs.

The FUs of each MC of the MCs may be heterogeneous FUs.

The reconfigurable processor may further include an external link configured to connect the MCs to one other; wherein each MC of the MCs may further include an internal link configured to connect the FUs of the MC to one other.

In another general aspect, a schedule apparatus based on mini-cores, (MCs) includes a local scheduler configured to map a first loop iteration to a first MC of a plurality of MCs; and map a second loop iteration to a second MC of the MCs; wherein each MC of the MCs includes a group of function units (FUs), the group of FUs having a capability of executing a loop iteration independently.

The schedule apparatus may further include a global scheduler configured to adjust a mapping relationship between the first loop iteration and the second loop iteration to generate a loop skew when there is a dependency between the first loop iteration and the second loop iteration.

The global scheduler may be further configured to delay the second loop iteration relative to the first loop iteration; and map the delayed second loop iteration to the second MC.

The global scheduler may be further configured to map the first loop iteration to the first MC; delay the second loop iteration relative to the first loop iteration; and map the delayed second loop iteration to the second MC.

The schedule apparatus may further include an MC configuration unit configured to group a plurality of FUs in a reconfigurable processor into the group of FUs of each of the MCs.

In another general aspect, a schedule method for a reconfigurable processor based on mini-cores (MCs) and including a plurality of function units (FUs) includes grouping the FUs in the reconfigurable processor into a plurality of MCs, each MC of the MCs including a group of FUs, the group of FUs having a capability of executing a loop iteration independently; mapping a first loop iteration to a first MC of the MCs; and mapping a second loop iteration to a second MC of the MCs.

The schedule method may further include adjusting a mapping relationship between the first loop iteration and the second loop iteration when there is a dependency between the first loop iteration and the second loop iteration.

The adjusting of the mapping relationship may include delaying the second loop iteration relative to the first loop iteration; and mapping the delayed second loop iteration to the second MC.

The adjusting of the mapping relationship may include mapping the first loop iteration to the first MC; delaying the second loop iteration relative to the first loop iteration; and mapping the delayed second loop iteration to the second MC.

In another general aspect, a reconfigurable processor includes a plurality of function units (FUs) having a capability of being reconfigured into a plurality of groups of FUs to form a plurality of mini-cores (MCs); wherein each group of the groups of FUs has a capability of executing a loop iteration independently; each MC of the MCs includes a respective group of the groups of FUs; and each MC of the MCs is configured to execute a different loop iteration of a plurality of loop iterations.

The MCs may be configured to start executing respective ones of the loop iterations simultaneously where there is no dependency between successive ones of the loop iterations.

Each MC of the MCs except one of the MCs further configured to execute a first loop iteration of the loop iterations may be further configured to start executing a respective one of the loop iterations a predetermined time after one of the MCs configured to execute an immediately preceding one of the loop iterations starts executing the immediately preceding loop iteration when there is a dependency between successive ones of the loop iterations.

The FUs in each of the groups of FUs may be homogeneous FUs.

The FUs in each of the groups of FUs may be heterogeneous FUs.

Other features and aspects will be apparent from the following detailed description, the drawings, and the claims.

DETAILED DESCRIPTION

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Figure 1:
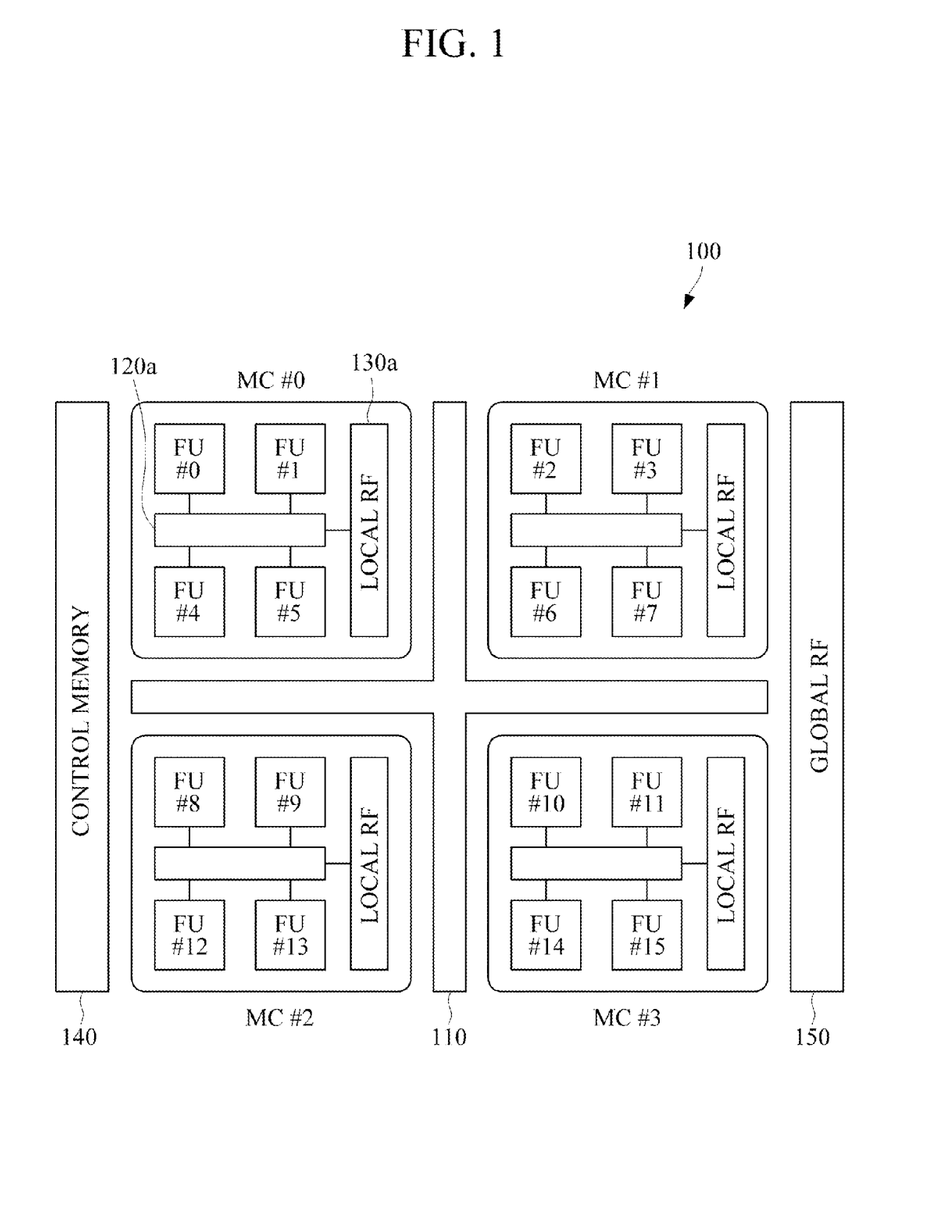
FIG. 1 is a diagram illustrating an example of a configuration of a reconfigurable processor.

FIG. 1 is a diagram illustrating an example of a configuration of a reconfigurable processor 100. Referring to FIG. 1, the reconfigurable processor 100 includes a plurality of mini-cores (MCs).

Each of the MCs includes a plurality of function units (FUs). Each of the FUs performs various arithmetic and/or logical operations.

Each MC may execute at least one loop iteration independently. Independent execution may mean that a loop iteration can be completely executed in an MC without help of other MCs. For example, MC #0 can complete execution of a specific loop iteration using FU #0, FU #1, FU #4, and FU #5. That is, an MC may be defined as a group of FUs that can execute a loop iteration, i.e., a group of FUs having a capability of executing a loop iteration independently.

The individual MCs may execute different loop iterations according to software pipelining. For example, MC #0 may execute a first loop iteration, and MC #1 may execute a second loop iteration. In other words, in loop scheduling based on software pipelining, each MC may be a schedule unit.

When there is a dependency between first and second loop iterations, an MC to which the second loop iteration is mapped starts executing the second loop iteration after execution of the first loop iteration starts. If a first loop iteration is mapped to MC #0, a second loop iteration is mapped to MC #1, and there is a dependency between the first and second loop iterations, MC #1 starts executing the second loop iteration after MC #0 starts executing the first loop iteration. In other words, if there is recurrence between the first and second loop iterations, time points at which the loop iterations start to be executed are adjusted in consideration of the recurrence.

In one example, the FUs of each MC are homogeneous FUs. For example, FU #0, FU #1, FU #4, and FU #5 in MC #0 have the same configuration.

In another example, the FUs of each MC are heterogeneous FUs. For example, at least two of FU #0, FU #1, FU #4, and FU #5 of MC #0 have different configurations. At least two FUs in each MC may have different computing powers. Computing power may be a kind of operation that is supported by the corresponding FUs. For example, an MC having an entire computing power may be defined as a group of FUs each having a partial computing power. The entire computing power may be defined as a kind of operation needed to execute at least one loop iteration.

The reconfigurable processor 100 further includes an external link 110, and an internal link 120a in each of the MCs (only the internal link in MC #0 is identified by reference numeral 120a in FIG. 1). The external link 110 provides communication paths between MCs, and the internal link 120a in each of the MCs provides communication paths between the FUs of the MC.

The reconfigurable processor 100 further includes a local register file (RF) 130a and a global register file 150. The local register file 130a stores results of operations performed by the FUs or context information of the FUs, and the global register file 150 stores results of operations performed by the MCs or context information of the MCs.

The reconfigurable processor 100 further includes a control memory 140. The control memory 140 defines connection relationships between the FUs and/or the MCs. In other words, the reconfigurable processor 100 may be optimized for an execution program according to configuration information stored in the control memory 140. The configuration information may be stored in the form of control bits that control connections between the FUs and/or the MCs for each operation cycle.

Figure 2:
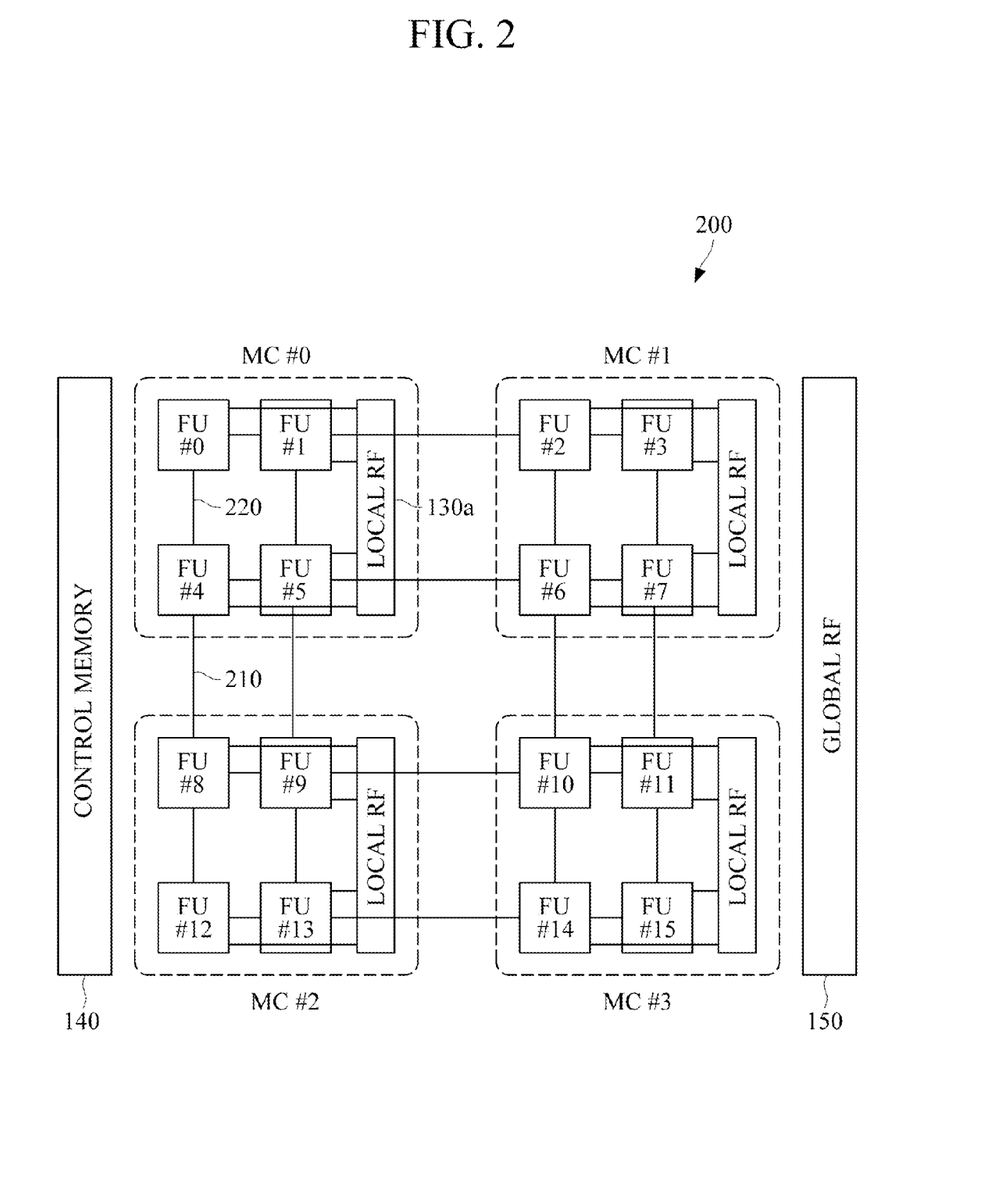
FIG. 2 is a diagram illustrating another example of a configuration of a reconfigurable processor.

FIG. 2 is a diagram illustrating another example of a configuration of a reconfigurable processor 200. Referring to FIG. 2, the reconfigurable processor 200 includes a plurality of MCs each having a plurality of FUs, a local register file 130a, a global register file 150, a control memory 140, and links 210 and 220. The FUs, the MCs, the local register file 130, the global register file 150, and the control memory 140 are the same as the corresponding components described above with reference to FIG. 1, and accordingly detailed descriptions thereof will be omitted.

In FIG. 2, the reconfigurable processor 200 has a configuration in which 16 FUs connected in a 4×4 mesh topology logically form 4 MCs. For example, links (for example, 210) between the MCs function as the external link 110 of FIG. 1, and links (for example, 220) in each MC function as the internal links 120a of FIG. 1.

Figure 3:
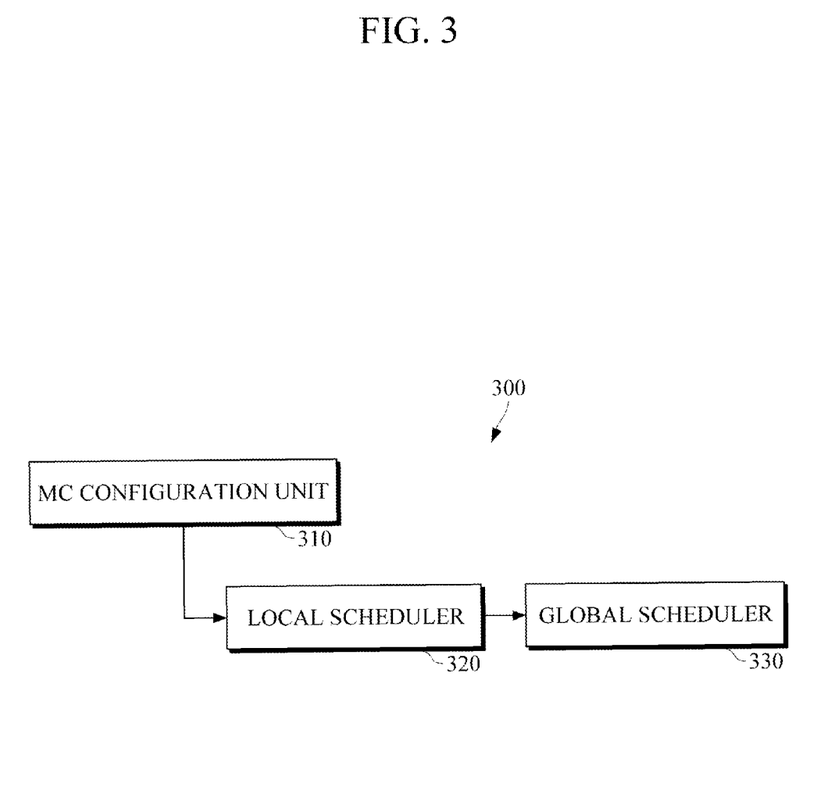
FIG. 3 is a diagram illustrating an example of a schedule apparatus for a reconfigurable processor.

FIG. 3 is a diagram illustrating an example of a schedule apparatus 300 for a reconfigurable processor. The schedule apparatus 300 may be applied to the reconfigurable processors 100 and 200 based on MCs illustrated in FIGS. 1 and 2. Referring to FIGS. 1, 2, and 3, the schedule apparatus 300 includes an MC configuration unit 310, a local scheduler 320, and a global scheduler 330.

The MC configuration unit 310 groups a plurality of FUs included in the reconfigurable processor 100 or 200 into a plurality of MCs. The MC configuration unit 310 groups a group of FUs capable of executing a loop iteration independently into one MC. For example, the MC configuration unit 310 defines an MC using hardware information of the reconfigurable processor 100 or 200. The hardware information of the reconfigurable processor 100 or 200 includes information about the computing powers and connection relationships of the FUs.

The local scheduler 320 maps a first loop iteration to a first MC and a second loop iteration to a second MC. In other words, the local scheduler 320 uses an MC as a schedule unit when scheduling loops according to software pipelining. The local scheduler 320 may use well-known optimizing techniques such as loop unrolling and loop coalescing.

The global scheduler 330 adjusts, when there is a dependency or recurrence between the first and second loop iterations, the mapping relationship to generate a predetermined loop skew. For example, the global scheduler 330 delays the second loop iteration relative to the first loop iteration and then maps the delayed second loop iteration to the second MC. At this time, the second MC may be physically connected to the first MC to which the first loop iteration is mapped.

The blocks shown in FIG. 3 have been logically classified according to their functions. Accordingly, the functions of the blocks shown in FIG. 3 may be classified according to different criteria. For example, two or more of the blocks shown in FIG. 3 may be integrated into a single block, or a part of functions that are performed by one of the blocks shown in FIG. 3 may be performed by one or more of the other blocks shown in FIG. 3.

Figure 4:
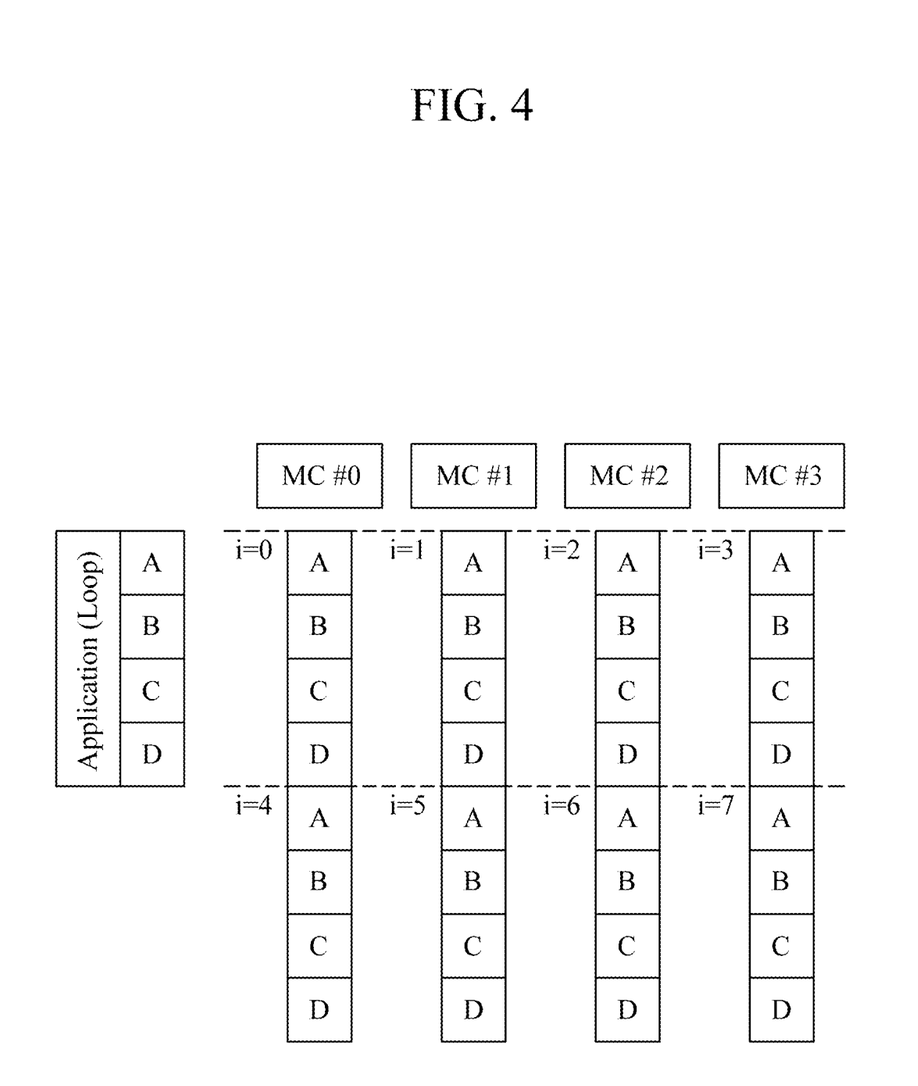
FIG. 4 is a diagram for explaining an example of a loop mapping method based on mini-cores (MCs).

FIG. 4 is a diagram for explaining an example of a loop mapping method based on MCs. Referring to FIGS. 3 and 4, the loop mapping method shown in FIG. 4 corresponds to the case where mapping is performed by the local scheduler 320 since there is no dependency between loop iterations.

In FIG. 4, a loop that is to be executed is segmented into four execution units A, B, C, and D. Each execution unit may be an instruction. For convenience of description, it will be assumed that the execution units A, B, C, and D are instructions. That is, the loop may be an application program in which the instructions A, B, C, and D are sequentially executed and the sequential execution of the instructions A, B, C, and D is iteratively performed.

In this example, there is no dependency between the loop iterations. For example, the instruction B of a first loop iteration (i=0) and the instruction B of a second loop iteration (i=1) may be executed at the same time.

Referring to FIGS. 3, and 4, the local scheduler 320 maps the first loop iteration (i=0) to MC #0 and the second loop iteration (i=1) to MC #1. As shown in FIG. 4, if four MCs are configured, the local scheduler 320 maps a fifth loop iteration (i=4) to MC #0 and a sixth loop iteration (i=5) to MC #1.

Since loop scheduling in the example in FIG. 4 is performed based on MCs each capable of executing a loop iteration independently, the efficiency and scalability of loop scheduling may be ensured even though the number of FUs increases.

Figure 5:
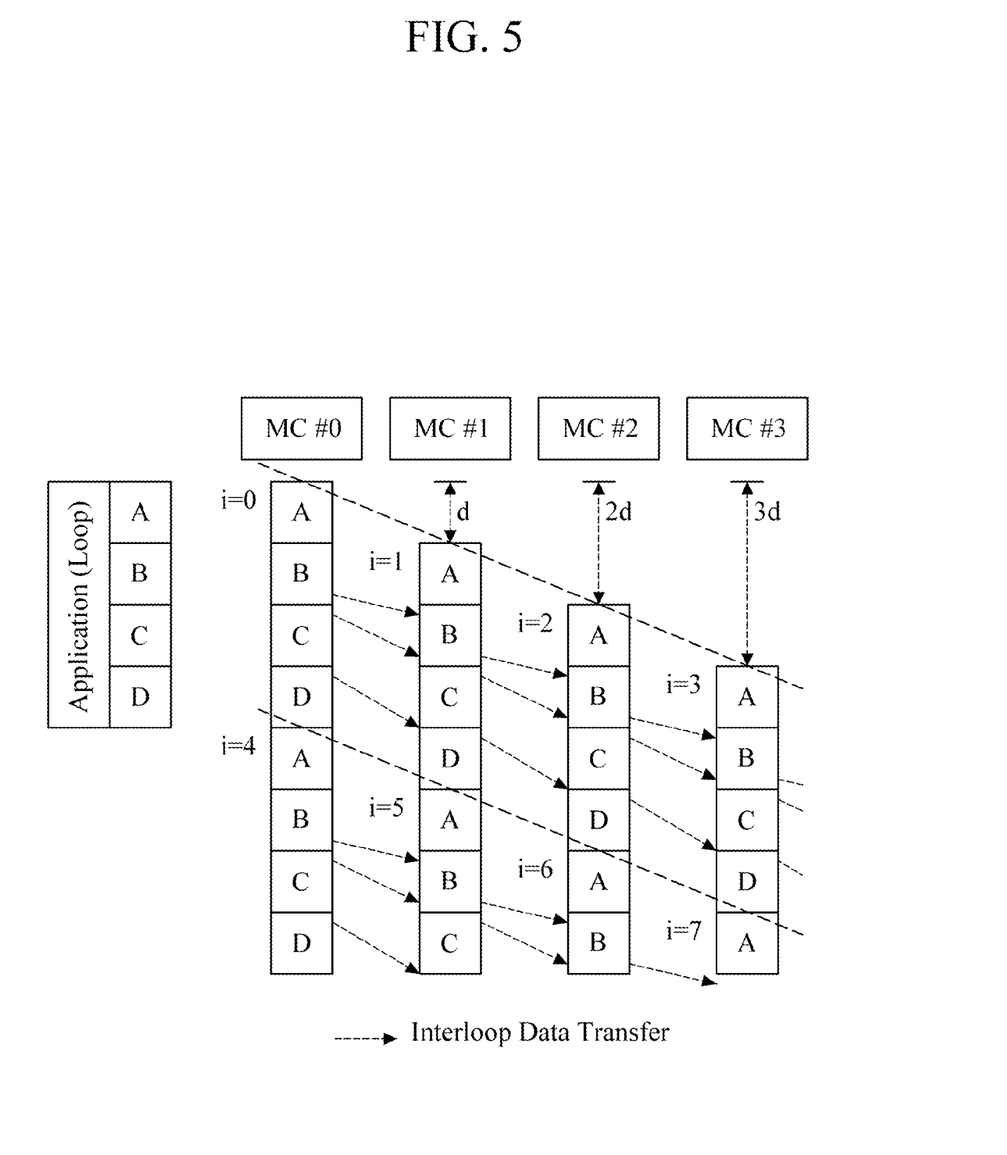
FIG. 5 is a diagram for explaining another example of a loop mapping method based on MCs.

FIG. 5 is a diagram for explaining another example of a loop mapping method based on MCs. Referring to FIGS. 3 and 5, the loop mapping method corresponds to the case where mapping is performed by both the local scheduler 320 and the global scheduler 330 since there is a dependency between loop iterations.

In FIG. 5, a loop that is to be executed is segmented into four execution units A, B, C, and D. Each execution unit may be an instruction. For convention of description, it will be assumed that A, B, C, and D are instructions. That is, the loop may be an application program in which the instructions A, B, C, and D are sequentially executed, and the sequential execution of the instructions A, B, C, and D is iteratively performed.

As described above, in this example, there is a dependency between the loop iterations. For example, in the case of the instruction B, if the result of execution of a first loop iteration (i=0) is used as an input of a second loop iteration (i=1) as shown in FIG. 5, it can be determined that there is a dependency or recurrence between the first and second loop iterations. The dashed lines with arrowheads between the instructions in FIG. 5 represent interloop data transfers, i.e., dependencies or recurrences.

Referring to FIGS. 3 and 5, the local scheduler 320 maps the first loop iteration (i=0) to MC #0 and the second loop iteration (i=1) to MC #1. As illustrated in FIG. 5, if four MCs are configured, the local scheduler 320 maps a fifth loop iteration (i=4) to MC #0 and a sixth loop iteration (i=5) to MC #1.

Since there is a dependency or recurrence between the loop iterations, the global scheduler 330 delays the second loop iteration (i=1) by a predetermined time (for example, d) and then maps the delayed second loop iteration to MC #1. Also, the global scheduler 330 delays the third loop iteration (i=2) by a predetermined time (for example, 2d), and then maps the delayed third loop iteration to MC #2. Also, the global scheduler 330 delays the fourth loop iteration (i=3) by a predetermined time (for example, 3d), and then maps the delayed fourth loop iteration to MC #3. The predetermined delay time may be defined as an appropriate value in consideration of the dependency or recurrence so that writing of the corresponding recurrence is performed as early as possible, and reading of the corresponding recurrence is performed as late as possible. This is aimed at minimizing a delay time of the second loop iteration, which is generated due to a dependency between the first loop iteration and the second loop iteration.

The global scheduler 330 adjusts a mapping relationship so that data related to recurrence is transferred through direct connections between MCs. Alternatively, the global scheduler 330 may adjust a mapping relationship so that data related to recurrence is transferred through the local register file (for example, 130a), the global register file 150, or an external memory (not shown).

It can be seen from FIG. 5 that all MCs operate in a steady state after an initial stage if there is a dependency or recurrence. If an average number of instructions per cycle (IPC) executed by an MC is "k", "k×(number of MCs)" instructions per cycle can be executed in the steady state.

Figure 6A:
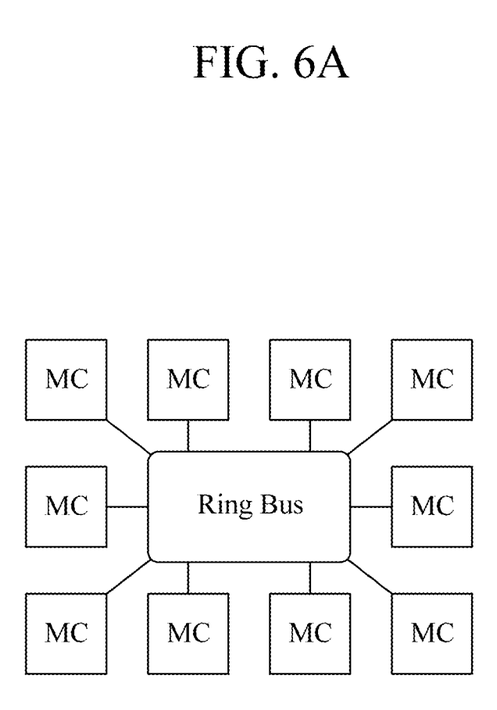
FIGS. 6A and 6B are diagrams illustrating examples of a structure for communication between MCs.
Figure 6B:
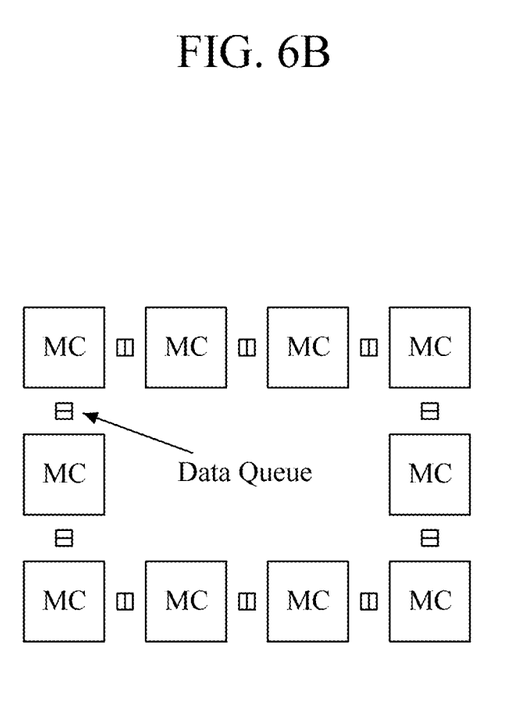

FIGS. 6A and 6B are diagrams illustrating examples of a structure for communication between MCs. In most cases, MCs transfer data only to their adjacent MCs, so high scalability can be obtained using a ring bus as shown in FIG. 6A, or using a data queue as shown in FIG. 6B. However, when necessary, such as in the case of data transmission between loop iterations that are distant from each other, which is relatively unusual, it is possible to transfer data using a global register file or an external memory.

Figure 7:
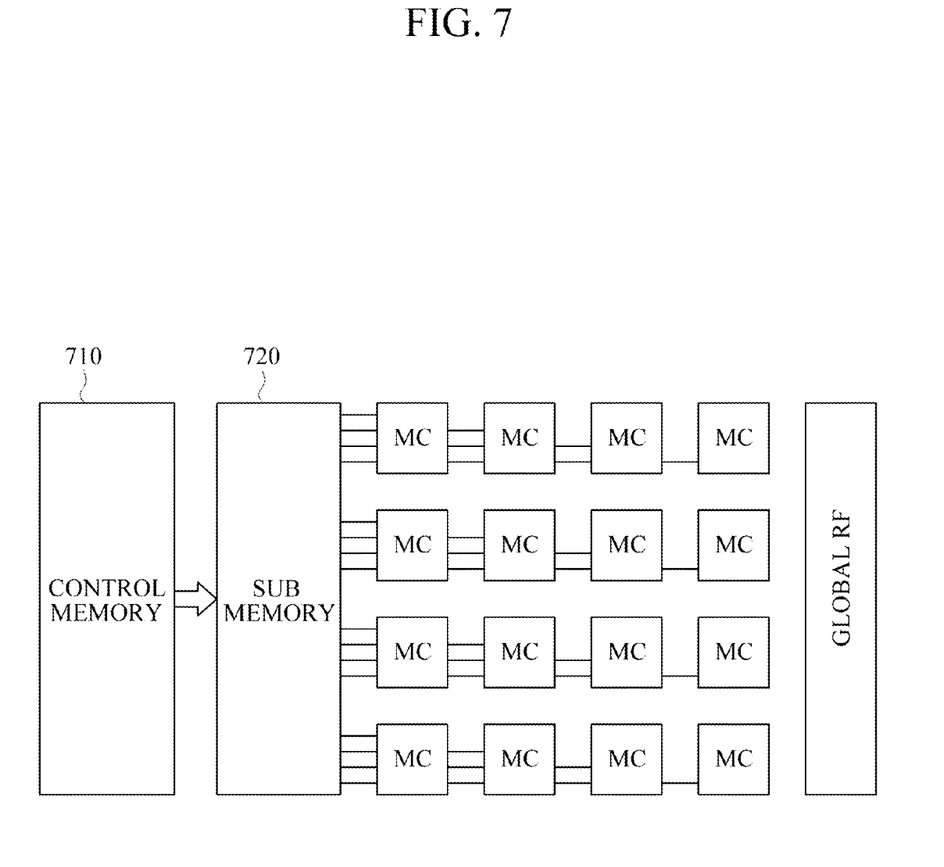
FIG. 7 is a diagram illustrating an example of a connection structure between a control memory and MCs.

FIG. 7 is a diagram illustrating an example of a connection structure between a control memory 710 and MCs. In this example, MCs share the same control information according to a loop scheduling algorithm. However, if there is a dependency between loop iterations, the MCs operate with predetermined time differences between the MCs.

If the MCs operate with no time difference between the MCs, all of the controls to the MCs should be the same, since the MCs execute the same code portions. This means that all of the connection lines between the control memory and the MCs may be shared, so the number of read ports of the control memory may be relatively small because it is possible to read once and distribute to all of the MCs.

On the other hand, if the MCs operate with time differences between the MCs, different MCs need to read different portions of the control memory. However, the number of read ports of the control memory is often limited due to area and/or power consumption issues. Accordingly, the MCs may share the same control information through a sub memory 720 connected to the control memory 710 and having a hierarchical structure to account for the time differences between the MCs. The sub memory 720 is responsible for providing different code portions to MCs operating at different times. The configuration of the sub memory 720 is not limited to any particular configuration, and the sub memory 720 may include a cache or flip-flops. The cache may prefetch a code portion for each MC, and/or cache a code portion already executed by one MC for execution by another MC. The flip-flops may provide delay handling. The sub memory 720 may be eliminated if the functionality of the control memory 710 includes the functionality of the sub memory 720.

Each of the MCs is connected to the sub memory 720 by a corresponding connection line. Although FIG. 7 appears to show connection lines passing through one MC to reach another MC, only the MC at the end of a connection line is actually connected to that connection line. Thus, in FIG. 7, there are 16 MCs and 16 connection lines, and each of the MCs is connected only to a corresponding one of the connection lines, and thus is directly connected to the sub memory 720 through the corresponding connection line.

Figure 8:
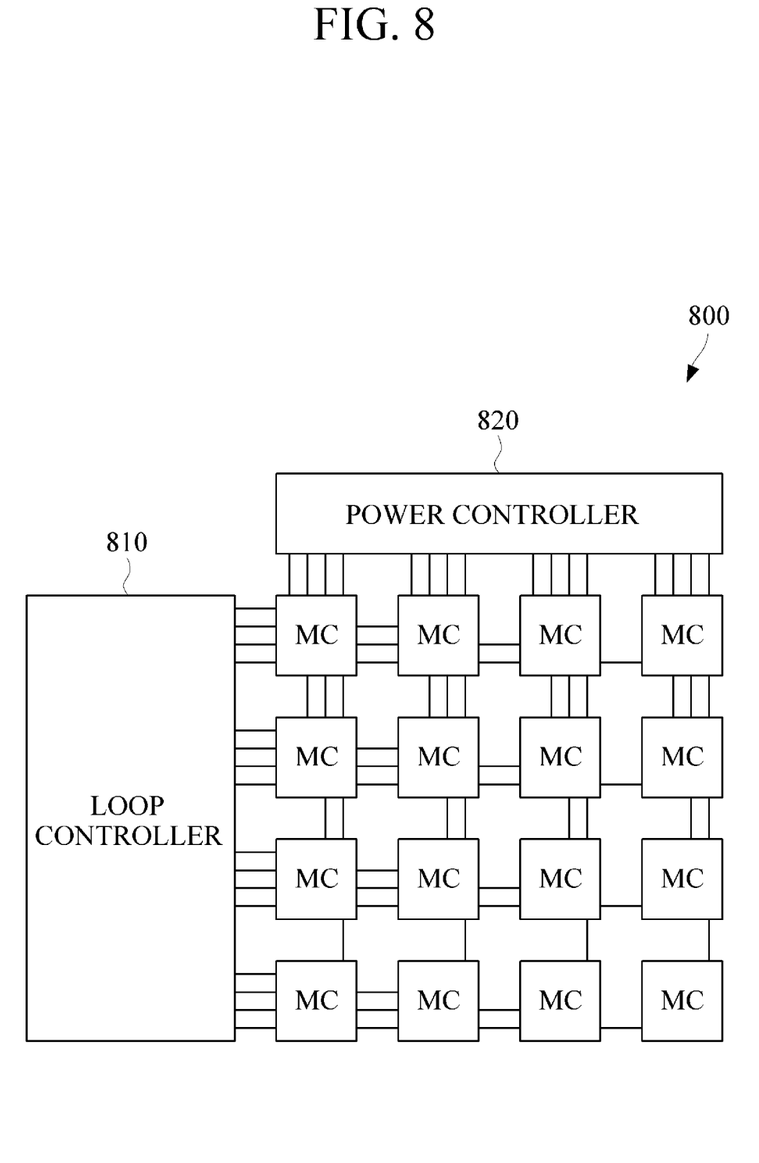
FIG. 8 is a diagram illustrating another example of a configuration of a reconfigurable processor.

FIG. 8 is a diagram illustrating another example of a configuration of a reconfigurable processor 800. Referring to FIG. 8, the reconfigurable processor 800 includes a loop controller 810, a power controller 820, and a plurality of mini-cores (MCs). Each of the MCs is connected to the loop controller 810 by a corresponding connection line, and to the power controller 820 by another corresponding connection line. Although FIG. 8 appears to show connection lines passing through one MC to reach another MC, only the MC at the end of a connection line is actually connected to that connection line. Thus, in FIG. 8, there 16 MCs and 32 connection lines, and each of the MCs is connected only to two corresponding ones of the connection lines, one connection line of which is connected to the loop controller 810, and the other connection line of which is connected to the power controller 820. Accordingly, each of the MCs is directly connected to the loop controller 810 through the one corresponding connection line, and is directly connected to the power controller 820 through the other corresponding connection line.

The direct connections between the loop controller 810 and the mini-cores shown in FIG. 8 enable the loop controller 810 to transfer signals to the MCs so that each MC can operate at a predetermined time, and also enable an MC that has executed a final loop iteration to transfer a signal to the loop controller 810 to terminate the iteration of the entire loop.

The power controller 820 prevents power from being applied to one or more of the MCs so that the one or more of the MCs do not operate. The power controller 820 may stop the operation of any of the MCs depending on a schedule or an application's purpose.

Figure 9:
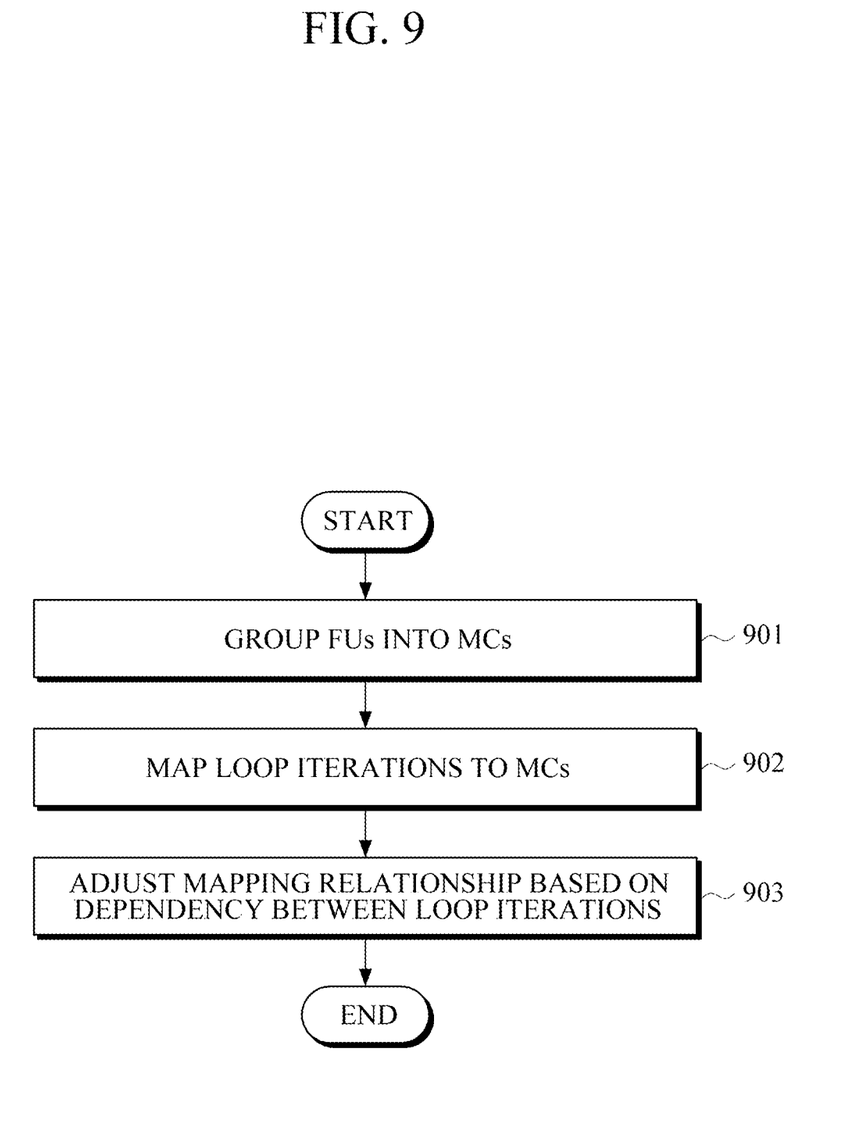
FIG. 9 is a flowchart illustrating an example of a scheduling method for a reconfigurable processor.

FIG. 9 is a flowchart illustrating an example of a scheduling method for a reconfigurable processor. Referring to FIGS. 3 and 9, FUs are grouped into several MCs according to the scheduling method (901). For example, the MC configuration unit 310 may group a plurality of FUs included in a reconfigurable processor into a plurality of MCs, with each of the MCs being defined as a group of FUs that can execute a loop iteration independently.

Then, each loop iteration is mapped to an MC (902). For example, the local scheduler 320 maps a first loop iteration to a first MC, and maps a second loop iteration to a second MC.

Then, the mapping relationship is adjusted based on a dependency between loop iterations (903). For example, if there is a dependency between the first and second loop iterations, the global scheduler 330 adjusts the mapping relationship to generate a loop skew in consideration of the dependency or recurrence as shown, for example, in FIG. 5.

In the examples described above, since loops are scheduled using MCs in consideration of recurrence, a high number of instructions per cycle (IPC) and good scalability can be achieved even in a large-scale system.

The schedule apparatus 300, the MC configuration unit 310, the local scheduler 320, the global scheduler 330, the loop controller 810, and the power controller 820 described above may be implemented using one or more hardware components, one or more software components, or a combination of one or more hardware components and one or more software components.

A hardware component may be, for example, a physical device that physically performs one or more operations, but is not limited thereto. Examples of hardware components include amplifiers, low-pass filters, high-pass filters, band-pass filters, analog-to-digital converters, digital-to-analog converters, buses, memory devices, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various modifications may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reconfigurable processor based on mini-cores (MCs), the reconfigurable processor comprising:
   MCs, each MC of the MCs comprising a group of function units (FUs), the group of FUs being configured to execute a loop iteration independently;
   a sub memory connected to the MCs and having a hierarchical structure with each section comprising a different code portion provided to the each MC of the MCs at delayed intervals between their respective loop iterations;
   wherein the MCs comprise:
      a first MC configured to execute a first loop iteration; and
      a second MC configured to execute a second loop iteration, wherein each MC executes different loop iterations according to loop scheduling based on software pipelining.

2. The reconfigurable processor of claim 1, wherein the second MC is further configured to start executing the second loop iteration in response to the first MC executing the first loop iteration in response to there being a dependency between the first loop iteration and the second loop iteration.

3. The reconfigurable processor of claim 1, wherein the FUs of each MC of the MCs are homogeneous FUs.

4. The reconfigurable processor of claim 1, wherein the FUs of each MC of the MCs are heterogeneous FUs.

5. The reconfigurable processor of claim 1, further comprising an external link configured to connect the MCs to one other;
   wherein each MC of the MCs further comprises an internal link configured to connect the FUs of the MC to one other.

6. A schedule apparatus based on mini-cores, (MCs), the schedule apparatus comprising a local scheduler configured to:

map a first loop iteration to a first MC of MCs; and
map a second loop iteration to a second MC of the MCs,
each MC of the MCs comprising a group of function units (FUs), the group of FUs being configured to execute a loop iteration independently, wherein each MC executes different loop iterations according to loop scheduling based on software pipelining and each MC is connected to a sub memory having a hierarchical structure with each section comprising a different code portion provided to the each MC of the MCs at delayed intervals between their respective loop iterations.

7. The schedule apparatus of claim 6, further comprising a global scheduler configured to adjust a mapping relationship between the first loop iteration and the second loop iteration to generate a loop skew in response to there being a dependency between the first loop iteration and the second loop iteration.

8. The schedule apparatus of claim 7, wherein the global scheduler is further configured to:
delay the second loop iteration relative to the first loop iteration; and
map the delayed second loop iteration to the second MC.

9. The schedule apparatus of claim 7, wherein the global scheduler is further configured to:
map the first loop iteration to the first MC;
delay the second loop iteration relative to the first loop iteration; and
map the delayed second loop iteration to the second MC.

10. The schedule apparatus of claim 6, further comprising an MC configuration unit configured to group FUs in a reconfigurable processor into the group of FUs of each of the MCs.

11. A schedule method for a reconfigurable processor based on mini-cores (MCs), the reconfigurable processor comprising function units (FUs), the schedule method comprising:
grouping the FUs in the reconfigurable processor into MCs, each MC of the MCs comprising a group of FUs, the group of FUs having a capability of executing a loop iteration independently;
mapping a first loop iteration to a first MC of the MCs;
mapping a second loop iteration to a second MC of the MCs; and
connecting, to the MCs, a sub memory having a hierarchical structure with each section comprising a different code portion provided to the each MC of the MCs at delayed intervals between their respective loop iterations, wherein each MC executes different loop iterations according to loop scheduling based on software pipelining.

12. The schedule method of claim 11, further comprising adjusting a mapping relationship between the first loop iteration and the second loop iteration in response to there being a dependency between the first loop iteration and the second loop iteration.

13. The scheduling method of claim 12, wherein the adjusting of the mapping relationship comprises:
delaying the second loop iteration relative to the first loop iteration; and
mapping the delayed second loop iteration to the second MC.

14. The scheduling method of claim 12, wherein the adjusting of the mapping relationship comprises:
mapping the first loop iteration to the first MC;
delaying the second loop iteration relative to the first loop iteration; and
mapping the delayed second loop iteration to the second MC.

15. A reconfigurable processor comprising:
function units (FUs) having a capability of being reconfigured into groups of FUs to form mini-cores (MCs);
wherein each group of the groups of FUs has a capability of executing a loop iteration independently;
each MC of the MCs comprises a respective group of the groups of FUs;
the each MC of the MCs is configured to execute a different loop iteration of loop iterations, wherein each MC executes different loop iterations according to loop scheduling based on software pipelining; and
the each MC of the MCs is connected to a sub memory having a hierarchical structure with each section comprising a different code portion provided to the each MC of the MCs at delayed intervals between their respective loop iterations.

16. The reconfigurable processor of claim 15, wherein the MCs are configured to start executing respective ones of the loop iterations simultaneously in response to there being no dependency between successive ones of the loop iterations.

17. The reconfigurable processor of claim 15, wherein each MC of the MCs except one of the MCs further configured to execute a first loop iteration of the loop iterations is further configured to start executing a respective one of the loop iterations a predetermined time later than one of the MCs configured to execute an immediately preceding one of the loop iterations starts executing the immediately preceding loop iteration in response to there being a dependency between successive ones of the loop iterations.

18. The reconfigurable processor of claim 15, wherein the FUs in each of the groups of FUs are homogeneous FUs.

19. The reconfigurable processor of claim 15, wherein the FUs in each of the groups of FUs are heterogeneous FUs.

20. The schedule apparatus of claim 7, wherein the global scheduler is further configured to:
delay a third loop iteration relative to the second loop iteration by a same time as the delay between the second loop iteration and the first loop iteration.

21. The schedule apparatus of claim 7, wherein the local scheduler is configured to map the first loop iteration and map the second loop iteration without using the global scheduler in response to there being no dependency between the first loop iteration and the second loop iteration.

22. The schedule apparatus of claim 7, further comprising:
a local register file configured to store results of operations performed by or context information of the FUs and data related to recurrence of the MCs; and
a global register file configured to store results of operations performed by or context information of the MCs; and wherein
the global scheduler is configured to adjust a mapping relationship by transferring the data related to recurrence through the global register file.

* * * * *